No. 890,400.
PATENTED JUNE 9, 1908.
G. BARTHOLD, Jr.
LUBRICATOR FOR VEHICLES.
APPLICATION FILED FEB. 26, 1908.
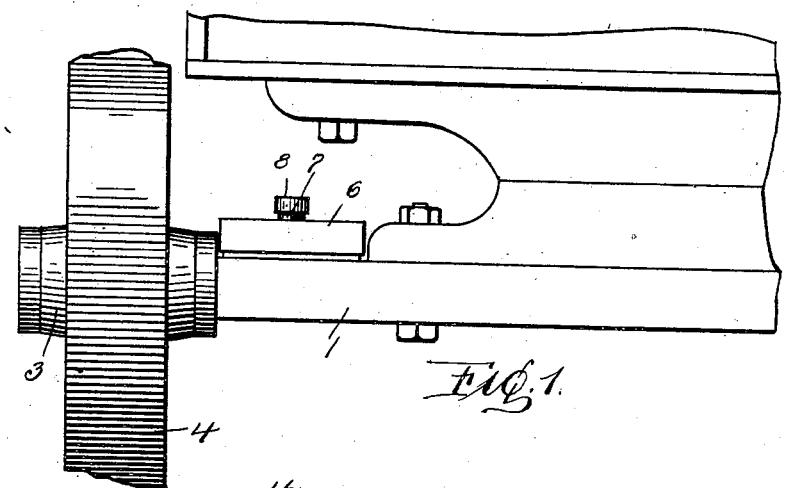
Fig. 1.
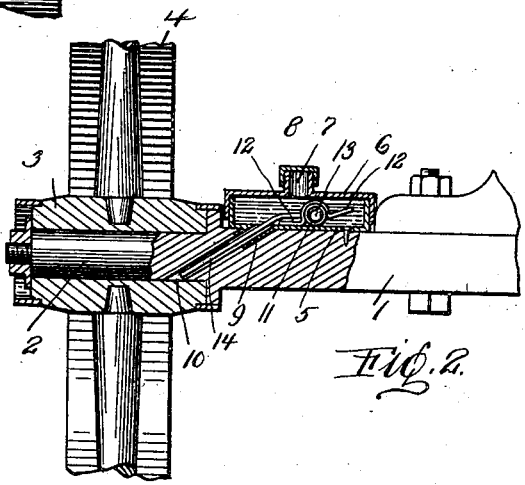
Fig. 2.
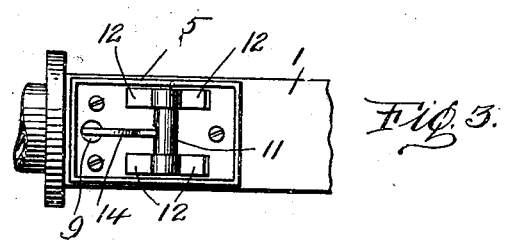
Fig. 3.
Fig. 4.
Witnesses
Samuel Payne
R. H. Butler
Inventor
G. Barthold, Jr.
By
Attorneys
THE NORRIS PETERS CO., WASHINGTON, D. C.

UNITED STATES PATENT OFFICE.

GEORGE BARTHOLD, JR., OF STEUBENVILLE, OHIO.

LUBRICATOR FOR VEHICLES.

No. 890,400.         Specification of Letters Patent.         Patented June 9, 1908.

Application filed February 26, 1908. Serial No. 417,923.

*To all whom it may concern:*

Be it known that I, GEORGE BARTHOLD, Jr., a citizen of the United States of America, residing at Steubenville, in the county of Jefferson and State of Ohio, have invented certain new and useful Improvements in Lubricators for Vehicles, of which the following is a specification, reference being had therein to the accompanying drawing.

This invention relates to a lubricator for vehicles, and the objects of my invention are, first, to provide the axle of a vehicle with a lubricant receptacle, the contents of which can be fed to the periphery of the spindle axle; second, to provide simple and effective means for lubricating an axle, without removing the wheel therefrom; third, to provide a lubricator that can be used in connection with various kinds of vehicles; fourth, to provide a novel means for preventing the lubricating port from becoming clogged.

I attain the above objects by a structure that will be presently described and then specifically pointed out in the appended claims.

Referring to the drawings forming part of this specification, Figure 1 is an elevation of my lubricator as applied to the axle of a vehicle. Fig. 2 is a longitudinal sectional view of the same. Fig. 3 is a plan of the lubricant receptacle with the cover thereof removed. Fig. 4 is an elevation of an agitator or feed rod removed from the lubricant receptacle.

In the accompanying drawings, 1 designates an axle rectangular in cross section. This axle is provided with a cylindrical spindle 2, upon which is journaled the hub 3 of a wheel 4. Suitably secured upon the axle 1 is a lubricant receptacle 5, having a cover plate 6, provided with an exteriorly threaded nipple 7, normally closed by a cap 8. The bottom of a receptacle 5 is provided with an angularly disposed sleeve 9 extending into a port 10, formed in the axle 1 and spindle 2, said port extending through the axle at an incline and terminating at the periphery of the spindle 2 at a point slightly removed from the rear or inner end of the latter.

Loosely mounted in the receptacle 5 is a slotted cylindrical casing 11 having angularly disposed supporting arms 12. In the casing 11 is loosely mounted a rock shaft 13 having an angular agitator or feeder rod 14, extending into the sleeve 9 and the port 10.

When the receptacle 5 is filled with a lubricant, through the nipple 7, the vibrations and jarring of the vehicle, when in action, is adapted to rock the casing 11 and the shaft 13 and cause the agitator 14 to gradually feed the contents of the receptacle to the periphery of the spindle 2.

A thick or heavy oil is preferably used as a lubricant, and the loosely mounted parts in the receptacle 5 are adapted to prevent this lubricant from coagulating, particularly within the port 10 of the axle 1.

It is apparent from the novel construction of my lubricator that it is unnecessary to remove the wheel 4 to lubricate the spindle of the axle; it will be understood that a lubricator is provided for each wheel of a vehicle.

My improvement is made of light and durable material, and I reserve the right to make such structural changes as are permissible by the appended claims.

Having now described my invention what I claim as new, is;—

1. In a lubricator, the combination of an axle having an inclined port formed therein, a lubricant receptacle secured to said axle and communicating with said port, a casing loosely mounted in said receptacle, a rock shaft arranged in said casing, and an agitator carried by said rock shaft and extending into said port, substantially as, and for the purpose described.

2. In a lubricator, the combination of an axle carrying a spindle and having an inclined port formed therein terminating at the periphery of the spindle thereof, a lubricant receptacle mounted upon said axle and communicating with said port, a rock-shaft arranged in said receptacle, and a feeder-rod carried by said rock-shaft and extending into said port, substantially as described.

3. In a lubricator, the combination with an axle having a port formed therein, of a lubricant receptacle located upon said axle having an angularly-extending sleeve projecting into said port, a rock-shaft within the receptacle, supporting means for said shaft, and a feeder-rod carried by the shaft and extending into said port.

In testimony whereof I affix my signature in the presence of two witnesses.

GEORGE BARTHOLD, JR.

Witnesses:
     LAFAYETTE MARTIN,
     LEMUEL E. MAPLE.